United States Patent
Sung et al.

(10) Patent No.: US 9,877,322 B1
(45) Date of Patent: Jan. 23, 2018

(54) METHOD AND APPARATUS FOR MANAGING AIR INTERFACE RESOURCE ALLOCATION BASED ON EVALUATION OF TRANSPORT BLOCK CAPACITY

(71) Applicant: Sprint Spectrum L.P., Overland Park, KS (US)

(72) Inventors: Sanghoon Sung, Ashburn, VA (US); Bharatwajan Raman, Arlington, VA (US); Udit Thakore, Fairfax, VA (US); Tri Duong, Annandale, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 124 days.

(21) Appl. No.: 14/814,926

(22) Filed: Jul. 31, 2015

(51) Int. Cl.
*H04W 72/04* (2009.01)
*H04W 88/08* (2009.01)
*H04L 5/00* (2006.01)

(52) U.S. Cl.
CPC ....... *H04W 72/0446* (2013.01); *H04L 5/0007* (2013.01); *H04W 88/08* (2013.01)

(58) Field of Classification Search
CPC ........... H04W 72/042; H04W 72/1205; H04W 74/006; H04W 74/0833; H04W 48/12; H04W 72/005; H04W 4/005; H04W 4/02; H04W 4/027; H04W 4/06; H04L 1/1819; H04L 1/1854; H04L 1/1864; H04L 1/189; H04B 17/318
See application file for complete search history.

(56) References Cited

U.S. PATENT DOCUMENTS

| | | | |
|---|---|---|---|
| 2012/0147830 A1* | 6/2012 | Lohr | H04W 72/042 370/329 |
| 2014/0098761 A1* | 4/2014 | Lee | H04W 74/006 370/329 |

* cited by examiner

*Primary Examiner* — Yee Lam

(57) ABSTRACT

A method and system to help manage air interface resources for communication between a user equipment device (UE) and a base station. As disclosed, a UE or base station detect a situation where a transport block that the base station would allocate to the UE would be too small to hold carry a packet that the UE would seek to transmit, and the UE and base station responsively switch to a mode of operation in which the UE will receive a multi-TTI transport block allocation rather than a single-TTI transport block allocation. Given a per-TTI limitation of available air interface resources, the allocation of a transport block spanning multiple TTIs may thus provide the UE with increased air interface capacity for transmission, thus optimally allowing the UE to transmit without a need for segmentation.

17 Claims, 6 Drawing Sheets

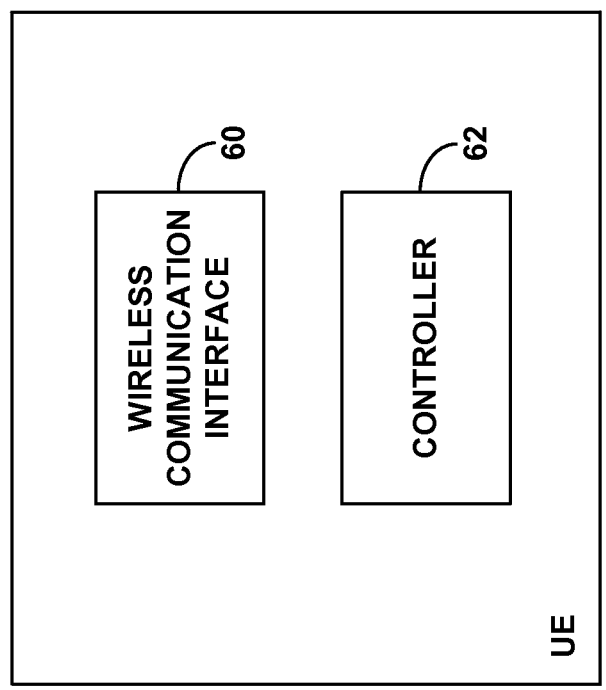

US 9,877,322 B1

METHOD AND APPARATUS FOR MANAGING AIR INTERFACE RESOURCE ALLOCATION BASED ON EVALUATION OF TRANSPORT BLOCK CAPACITY

BACKGROUND

Unless otherwise indicated herein, the description provided in this section is not itself prior art to the claims and is not admitted to be prior art by inclusion in this section.

In a wireless communication system, a base station may serve user equipment devices (UEs) such as cell phones, wirelessly-equipped computers, tracking devices, embedded wireless modules or the like over an air interface. In practice, the air interface may define a continuum of transmission time intervals (TTIs) in which communications may pass on a downlink from the base station to the UEs and on an uplink from the UEs to the base station. In particular, in each TTI, the air interface may define a quantity of air interface resources, such as physical resource blocks (PRBs) or the like on which data may be modulated using an appropriate modulation and coding scheme.

When a UE is served by a base station in such an arrangement and the UE has data to communicate over the air to the base station, the UE may transmit to the base station a scheduling request asking the base station to assign air interface resources for uplink data transmission to the base station. Considering various factors, such as the extent of data that the UE has buffered for transmission, the UE's current air interface signal strength, the UE's available transmission power, and current load on the air interface, the base station may then allocate certain uplink air interface resources as a "transport block" for use by the UE to engage in uplink data transmission, providing a directive to the UE indicating the allocated resources. And the UE may then transmit data to base station on the allocated air interface resources.

In practice, a UE engaged in such communication may implement a protocol stack defining a sequence of logical processing layers, ranging from an application layer down to a physical layer, with the UE processing the data at each layer, such as by adding a layer-specific header or other overhead. For instance, the application layer may output application data (e.g., user data) as a series of application-layer protocol data units (PDUs) each encoded in an application-layer specific manner, the next layer down may receive each such application-layer PDU as a respective service data unit (SDU) and may add its own layer-specific overhead and output a PDU for processing by the next layer down from it, and so forth. Ultimately, this processing would then culminate in the physical layer outputting the data for transmission over the air to the base station.

As a specific example of this, a UE engaged in voice over Internet Protocol (VoIP) communication may apply a voice codec at its application layer to encode digitized voice at a particular rate, such as an Adaptive Multi-Rate (AMR) Wideband 12.65 codec that generates 253 bits of coded speech every 20 milliseconds (for a net data rate of 12.65 kilobits per second) and may encapsulate each 253 bits in a Real-time Transport Protocol (RTP) header of typically 12 bytes as an RTP packet. Each RTP packet may then pass to a Transport layer, which may add a UDP header of typically 8 bytes, and to an Internet layer, which may add an IPv6 header of typically 40 bytes, thus producing an IP packet of about 733 bits every 20 milliseconds. To facilitate efficient air interface transmission of such a packet, the packet may then pass to a Packet Data Convergence Protocol (PDCP) layer, which may apply robust header compression (RoHC) that may replace the RTP, UDP, and IP headers with a much smaller RoHC header typically around 3 bytes (i.e., just 24 bits). In turn, each packet with compressed header may then pass through one or more link layers such as a Radio Link Protocol (RLP) layer, which may add an RLP header, and a Media Access Control (MAC) layer, which may add a MAC layer, and the end result may then be modulated on the physical layer for transmission in allocated air interface resources to the base station.

In this process, each packet that arrives at the RLP layer is an RLP SDU, and the RLP layer and MAC layer would then add overhead to that RLP SDU, thus producing a MAC PDU. Optimally, the UE would then transmit this MAC PDU in a particular uplink transport block allocated by the base station. In some cases, however, the transport block allocated by the base station may not be large enough to carry the RLP SDU plus the added RLP and MAC overhead. This may happen, for instance, if the UE is in relatively poor coverage of the base station, in which case the UE may need to use a relatively low-order modulation and coding scheme in which individual air interface resources represent fewer bits of data, so that more air interface resources are needed to represent a given extent of data. Further, this may happen if the UE's available transmit power limits the number of PRBs on which the UE can transmit concurrently in a given TTI.

When faced with a situation where the transport block allocated by the base station is not large enough to carry the RLP SDU plus the added RLP and MAC overhead, the UE may resort to segmenting the RLP SDU into two or more RLP SDUs and processing each smaller RLP SDU separately through the RLP, MAC, and physical layers for transmission in a respective transport block. Further, in this situation, the base station may recognize that the transport block per TTI would be too small to carry the UE's intended MAC PDU, and so the base station may responsively allocate multiple transport blocks to the UE allow the UE to transmit the multiple segments each as a separate MAC PDU (with respective added overhead). For instance, the base station may allocate the required number of single-TTI transport blocks in consecutive TTIs or otherwise in upcoming TTIs.

A problem with this segmentation process, however, is that it adds potentially extensive additional overhead to the overall transmission, since the UE adds RLP and MAC overhead respectively to each segment of the original RLP SDU, rather than merely adding RLP and MAC overhead to the entire RLP SDU. This added overhead may thus contribute to air interface load, which could impact user experience for the UE and for others. Further, this increase in overhead may also delay the UE's overall communication, which could further impact user-experience, particularly for latency-sensitive communications such as voice.

Overview

One reason for the problem with existing systems like that described above is that the base station may allocate each transport block in only a single TTI, and the UE may require that each MAC PDU be transmitted in a single transport block. Thus, each time the base station provides a UE with an allocation of a transport block, the transport block would be defined as particular air interface resources (e.g., particular PRBs) within a single TTI. And if the UE's planned MAC PDU would be too big to fit within that single-TTI transport block, the UE would then resort to segmentation, as noted above, to produce multiple RLP SDU segments, each of which would receive added RLP and MAC overhead to produce a respective MAC PDU—and the base station may allocate multiple single-TTI transport blocks, one for each of those MAC PDUs.

Disclosed herein is a method and system to help better manage air interface resources, and particularly to help avoid the need to engage in segmentation as described above. In accordance with the disclosure, a UE or base station will detect a situation where the transport block that the base station will allocate to the UE would be too small to carry a packet that the UE seeks to transmit, and the UE and base station will responsively switch to a mode of operation in which the UE will receive a multi-TTI transport block allocation rather than a single-TTI transport block allocation. Given a per-TTI limitation of available PRBs, the allocation of a transport block spanning multiple TTIs may thus provide the UE with increased air interface capacity for transmission, thus optimally allowing the UE to transmit without a need for segmentation.

In practice, for instance, the UE may monitor its channel conditions and/or its recent history of transport block allocation by the base station, and based on those factors and/or other information, may predict that the transport blocks that the base station will allocate to the UE will each be too small to carry the RLP SDU plus RLP and MAC overhead that the UE expects to generate (for VoIP communication for example). In response to such a prediction, the UE may then transition from a single-TTI mode to a multi-TTI mode, signaling to the base station accordingly as noted above.

Accordingly, in one respect, disclosed herein is a method for managing communication over an air interface between a UE and a base station serving the UE, where the air interface defines a continuum of TTIs each defining air interface resources, and where the UE is configured with a protocol stack through which the UE processes outbound data for transmission from the UE to the base station, the protocol stack including an upper layer (e.g., a PDCP layer) that provides a data packet for transmission, one or more middle layers (e.g., RLP and MAC layers) that add overhead to the data packet, and a physical layer that transmits the data packet with the added overhead via the air interface to the base station.

In accordance with the disclosure, the method involves operating in a single-TTI mode in which transport block allocation for transmitting the outbound data is single-TTI transport block allocation. Further, the method involves determining that the data packet plus the added overhead would be too large to fit within an allocated single-TTI transport block. And the method involves, in response to that determination, transitioning from operating in the single-TTI mode to operating in a multi-TTI mode in which transport block allocation for transmitting the outbound data is multi-TTI transport block allocation.

In another respect, disclosed is a method for managing voice communication over an air interface between a UE and a base station serving the UE, where the air interface defines a continuum of TTIs each defining air interface resources, and where the UE is configured with a protocol stack through which the UE processes outbound data for transmission from the UE to the base station, the protocol stack including a PDCP layer that provides voice packets of a fixed size periodically for transmission, an RLP layer and MAC layer that add overhead respectively to each voice packet, and a physical layer that transmits each voice packet respectively with the added overhead via the air interface to the base station.

In accordance with the method, the UE operates in a single-TTI mode in which the UE receives, from the base station, allocation of a single-TTI transport blocks each in a single TTI, and in which the UE accordingly transmits data respectively in each allocated single-TTI transport block. Further, the UE determines that each of one or more of the single-TTI transport blocks will be too small to carry one of the fixed size voice packets along with its added overhead (e.g., insufficient to transmit the resulting MAC SDU). And in response to that determination, the UE then transitions from operating in the single-TTI mode to operating in a multi-TTI mode in which the UE receives, from the base station, allocation of multi-TTI transport blocks each spanning multiple TTIs, and in which the UE accordingly transmits data respectively in each allocated multi-TTI transport block.

Still further, in yet another respect, disclosed is an apparatus (e.g., as a UE) operable to be served by a base station over an air interface, where the air interface defines a continuum of TTIs each defining air interface resources. In accordance with the disclosure, the apparatus comprises a wireless communication interface (e.g., cellular radio and associated components) for engaging in wireless communication over the air interface with the base station, and a controller operable to manage communication of data from the apparatus to the base station in the manner described above for instance.

In a representative implementation, the controller of such an apparatus thus defines a protocol stack through which the apparatus processes outbound data for transmission from the apparatus to the base station, the protocol stack including an upper layer that provides a data packet for transmission, one or more middle layers that add overhead to the data packet, and a physical layer that transmits the data packet with the added overhead via the air interface to the base station. Further, the apparatus is configured to operate in a single-TTI mode in which the apparatus receives via the wireless communication interface, from the base station, allocation of single-TTI transport blocks for transmitting the outbound data, and in which the apparatus transmits the outbound data via the wireless communication interface accordingly. And the controller is configured to make a determination that the data packet plus the added overhead would be too large to fit within a single-TTI transport block that would be allocated to the apparatus and to respond to the determination by causing the apparatus to transition from operating in the single-TTI mode to operating in a multi-TTI mode, where, in the multi-TTI mode, the apparatus receives via the wireless communication interface, from the base station, allocation of multi-TTI transport blocks, rather than single-TTI transport blocks, for transmitting the outbound data, and in which the apparatus transmits the outbound data via the wireless communication interface accordingly.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

BRIEF DESCRIPTION OF THE DRAWINGS

FIG. 6 is a simplified block diagram depicting components of an example UE.

DETAILED DESCRIPTION

Figure 1:
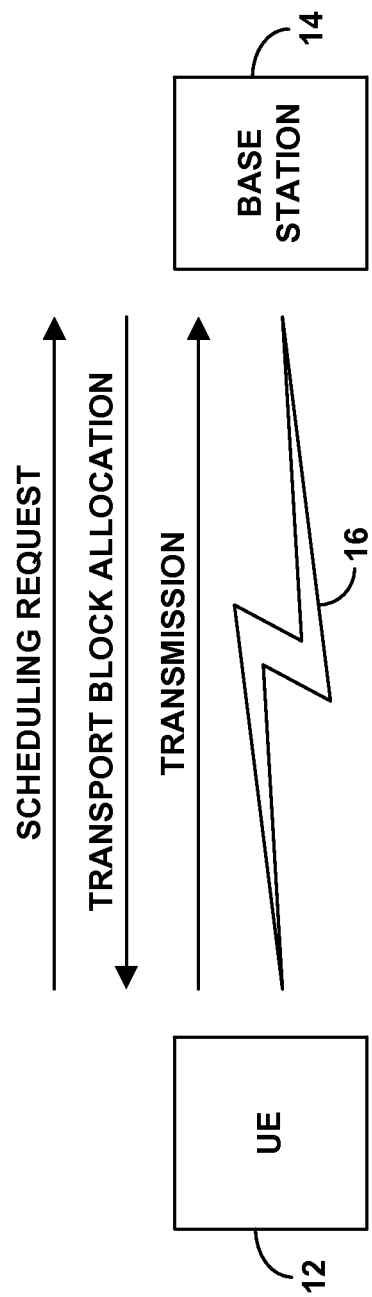
FIG. 1 is a simplified depiction of an arrangement where a representative UE is served by a base station over an air interface.

The present disclosure will focus on implementation in a Long Term Evolution (LTE) communication system and with respect to voice communication. Principles of the disclosure can apply in other contexts as well, however, such as with respect to radio access technologies other than LTE, and with respect to communications other than voice. Further, numerous variations from the specifics described, even within the context of LTE and voice communication are possible as well. As such, the disclosure should be understood to be generally illustrative rather than limiting.

LTE is an example of an orthogonal frequency division multiple access (OFDMA) radio access technology in which the air interface between a base station (evolved Node-B (eNodeB)) and served UEs is structured as noted above. In particular, the air interface on both the downlink and the uplink may span a particular frequency bandwidth (such as 1.4 MHz, 3 MHz, 5 MHz, 10 MHz, or 20 MHz) that is divided primarily into subcarriers that are spaced apart from each other by 15 kHz. Further, the air interface may be divided over time into a continuum of 10-millisecond frames, with each frame being further divided into ten 1-millisecond subframes each defining a respective TTI. In each TTI, the air interface may then be considered to define a number of 12-subcarrier wide PRBs across the frequency bandwidth (i.e., as many PRBs as would fit in the frequency bandwidth).

In addition, each PRB may be divided over time into symbol segments of 67 μs each, with each symbol segment spanning the 12-subcarriers of the resource block and thus each supporting transmission of 12 orthogonal frequency division multiplex (OFDM) symbols in respective "resource elements." Thus, the base station and a served UE may transmit symbols to each other in these resource elements, particularly on subcarriers that are spaced apart from each other by 15 kHz and in time segments spanning 67 μs each.

The LTE air interface may then define various channels made up of certain ones of these resource blocks and resource elements. For instance, on the downlink, certain resource elements across the bandwidth may be reserved to define a physical downlink control channel (PDCCH), and other resource elements may be reserved to define a physical downlink shared channel (PDSCH) that the base station can allocate on an as-needed basis (by allocating the PRBs defining those PDSCH resource elements) to carry transmissions to particular UEs, with still other resource elements being reserved to define a downlink reference signal. Likewise, on the uplink, certain resource elements across the bandwidth may be reserved to define a physical uplink control channel (PUCCH), and other resource elements may be reserved to define a physical uplink shared channel (PUSCH) that the base station can allocate on an as-needed basis to carry transmissions from particular UEs (by allocating the PRBs defining those PUSCH resource elements).

Depending on the bandwidth of the coverage area, the air interface will thus have a particular limited extent of resources (resource units, such as PRBs and resource elements) that the eNodeB can allocate per unit time, such as per TTI. In practice, the base station may manage this allocation based on various factors such as the extent of data to be communicated, the UE's air interface channel quality, the load on the air interface, and so forth.

For instance, if the UE reports to the base station that the UE has a lot of data to transmit, the base station may seek to allocate a greater extent of resources. Further, if the base station is seeking to serve multiple UEs concurrently in a given TTI, the base station may limit the extent of resources per TTI that the base station allocates to any given UE.

Still further, the base station and a served UE may dynamically select a modulation and coding scheme (MCS) to use for modulating data on air interface resources based on the UE's channel quality and perhaps other factors, with each MCS supporting a corresponding bit rate. For instance, when the UE's channel quality is poor, the base station and UE may use a low-order MCS such as Quadrature Phase Shift Keying (QPSK), in which each symbol represents just 2 bits of data. Whereas, if the UE's channel quality is medium, the base station and UE may use a mid-order MCS such as 16 Quadrature Amplitude Modulation (16QAM), in which each symbol represents 4 bits of data. And if the UE's channel quality is high, the base station and UE may use a high-order MCS such as 64QAM, in which each symbol represents 6 bits of data. Further gradations of MCS and bit rate are possible as well.

In practice, a UE may from time to time determine its channel quality based on downlink air interface quality (e.g., downlink reference signal strength) and one or more other factors (e.g., UE's capabilities) and transmit to the base station a channel quality indicator (CQI) indicating the UE's determined channel quality. Using a standard CQI-MCS mapping table that maps CQI to MCS, the base station may then determine from the reported CQI what MCS to use for communication with the UE, and the base station may allocate air interface resources accordingly. Alternatively or additionally, the base station may from time to time evaluate uplink air interface quality (e.g., uplink reference signal strength) as a basis to determine the UE's channel quality, and the base station may similarly select an appropriate MCS for air interface communication with the UE.

When a UE is served by a base station in this arrangement and has data to transmit, the UE may transmit a scheduling request to the base station on the PUCCH, noting how much data the UE has buffered to transmit, and perhaps noting service level and/or other attributes of the planned communication. In response, the base station may then allocate one or more PRBs defining a transport block for the UE and may transmit to the UE on the PDCCH a Downlink Control Information (DCI) message that specifies the allocated PRBs and perhaps specifying an MCS for the UE to use for the transmission in view of the latest determined channel conditions. In practice, this allocated transport block will be in a single TTI, typically four milliseconds after the TTI in which the base station sends the DCI message to the UE.

Further, if the UE will be engaging in periodic transmission, such as for VoIP communication for instance, the UE may include in its scheduling request to the base station an indication of the type and periodic nature of the communication. And the base station may then apply semi-persistent scheduling by allocating a periodically recurring single-TTI transport block for the UE and may transmit to the UE a DCI message that specifies the periodically recurring transport block. For VoIP using the AMR Wideband 12.65 codec as described above, for instance, the base station may allocate a single-TTI transport block with a recurrence of 20 milliseconds, to carry a voice packet every 20 milliseconds.

Provided with the transport block allocation from the base station, the UE may then transmit accordingly. For instance, if the base station allocates a transport block consisting of particular PRBs in a specified TTI at a specified MCS, the UE may then transmit data in those particular PRBs in the specified TTI using the particular MCS. Likewise, if the base station applies semi-persistent scheduling and thus allocates a periodically recurring single-TTI transport block, the UE may then transmit data in each periodic recurrence of the transport block.

As noted above, the present disclosure addresses a problem where a transport block that would be allocated to a UE for uplink transmission would not be large enough to carry data that the UE would seek to transmit in the transport block, considering the MCS that the UE would use for the transmission. For instance, the disclosure may address a situation where the transport block that would be allocated to a UE for uplink transmission would not be large enough to carry a MAC PDU, consisting of an RLP SDU plus added RLP and MAC overhead. And as a specific example of this, the disclosure may address a situation where a UE will engage in VoIP communication in which the UE periodically generates voice packets as RLP SDUs of a fixed size, where the UE adds RLP and MAC overhead of fixed size to each RLP SDU to produce a MAC PDU of predetermined size, and where the single-TTI transport block the base station would allocate to the UE would be too small to carry such a MAC PDU, considering the MCS that the UE would use for the transmission.

In these situations, to help avoid the need for segmentation, the present disclosure involves the UE and base station transitioning to a multi-TTI mode in which the base station will provide, and the UE will receive, allocation of a transport block that includes PRBs in multiple TTIs rather than allocation of a transport block that includes PRBs in just a single-TTI. In particular, the base station and UE could transition to this mode so that each transport allocated to the UE is then a multi-TTI transport block rather than a single-TTI transport block. Given the limitation on the number of PRBs per TTI that can be allocated as a transport block for use by the UE, this arrangement helps to avoid the need for segmentation by allowing the UE to distribute its transmission (e.g., MAC PDU transmission) among multiple TTIs.

FIG. 1 depicts an arrangement where a representative UE 12 is served by a base station 14 over an air interface 16. In a system compliant with LTE, the air interface may be structured as noted above, defining a continuum of TTIs and defining, in each TTI, a quantity of PRBs that cooperatively span a carrier frequency bandwidth. On this air interface, if the UE has data to transmit over the air to the base station (for transmission via the base station to another UE or other endpoint), the UE may transmit a scheduling request to the base station, and the base station may allocate a transport block (or periodically recurring transport blocks) and may transmit to the UE a DCI message specifying the allocation. The UE may then engage in transmission accordingly.

Figure 2:
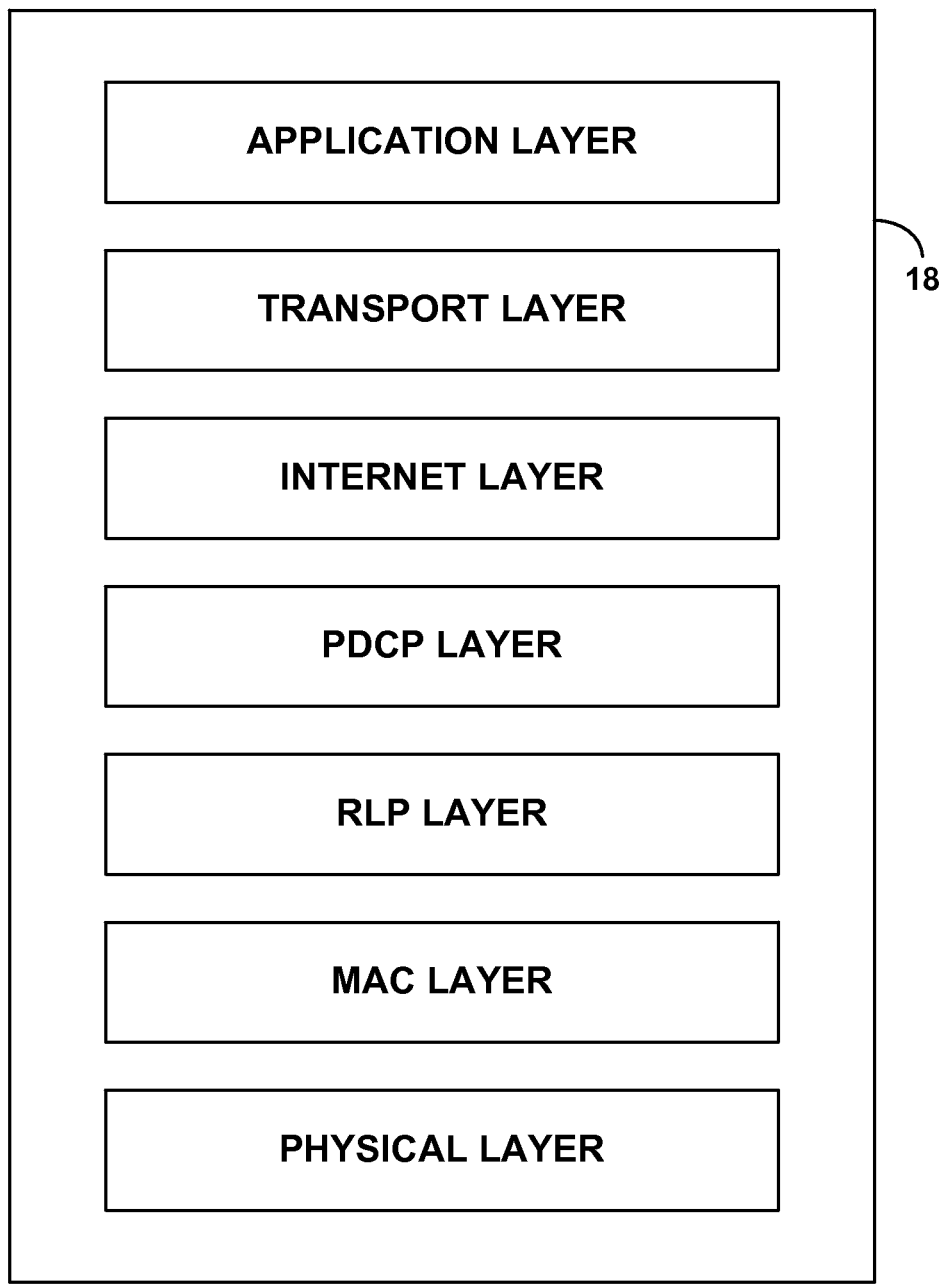
FIG. 2 is a simplified depiction of an example protocol stack for processing outbound data.

FIG. 2 is next a simplified depiction of an example protocol stack 18 that a UE may apply in processing data for transmission on the air interface to the base station. In general, such a protocol stack defines an upper layer that provides data packets, then one or more middle layers that add overhead to those packets (and/or that may otherwise modify the packet, possibly removing some overhead), and a physical layer on which the data packet plus the added overhead would be transmitted. More particularly, as shown by way of example, protocol stack 18 defines an application layer, a transport layer, an Internet layer, a PDCP layer, an RLP layer, a MAC layer, and a physical layer. In this arrangement, the PDCP layer may be the upper layer that provides the each data packet, and the RLP layer and MAC layer may be middle layers that add overhead (e.g., an RLP header and a MAC header), to produce a MAC PDU, and the physical layer may then encode that MAC PDU on OFDM symbols for air interface transmission.

When the UE is engaged in data communication, the UE may know the size (e.g., number of bits) of each such MAC PDU, perhaps given knowledge of the size of each RLP SDU and given knowledge of the size of RLP and MAC overhead that would be added to each RLP SDU. This may be the case especially with communication that involves recurring transmission of fixed sized packets. For instance, applying the AMR Wideband 12.65 codec for VoIP communication as described above, the UE may generate an RLP SDU as a voice packet of known, fixed size every 20 milliseconds, and the UE may add to each such RLP SDU both RLP and MAC overhead also of known, fixed size, so as to produce a MAC PDU of known, fixed size every 20 milliseconds.

Likewise, the base station that is serving the UE may also know the size of each MAC PDU that the UE will transmit. For instance, the base station may have knowledge that the UE is engaged in a particular type of communication, such as VoIP communication using a codec such as that noted above, and the base station may have knowledge of the size of MAC PDUs generated for such communication.

As noted above, a representative system may require that each MAC PDU be physically transmitted in a single transport block. Further, the representative system may normally provide for single-TTI transport block allocation. The present method then provides for transitioning from single-TTI transport block allocation to multi-TTI transport block allocation in response to determining that a single-TTI transport block will not be large enough to carry an expected MAC PDU. FIG. 3, parts A and B, illustrates these transport block allocations by way of example.

Figure 3A:
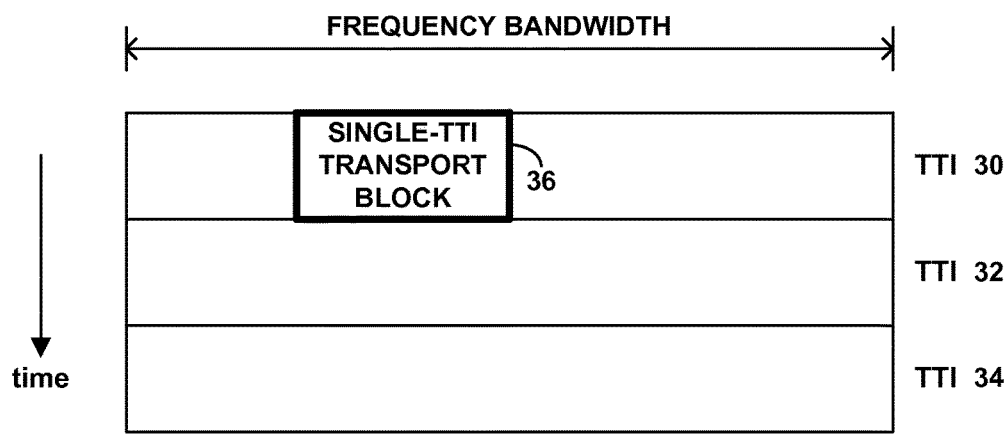
FIGS. 3A and 3B are depictions of example transport block allocations.

FIG. 3A depicts three consecutive TTIs 30-34 on an LTE air interface, with each TTI being 1 millisecond long and the air interface spanning a carrier frequency bandwidth. FIG. 3A then depicts a representative single-TTI transport block 36 as a portion of one of the illustrated TTIs. In practice, this transport block may consist of one or more PRBs in the TTI. Further, although the figure shows the transport block as a single portion of the TTI, a representative transport block could alternatively encompass non-contiguous PRBs in a TTI.

If a UE would have a MAC PDU to transmit and would receive base station allocation of such a single-TTI transport block, at issue as noted above is whether the transport block would be large enough to carry the MAC PDU, considering the MCS that the UE will use for the transmission. If the transport block would not be large enough to carry the MAC PDU, then per the present method, the UE and base station may responsively transition to a multi-TTI mode in which the base station would provide and the UE would receive multi-TTI transport block allocation rather than single-TTI transport block allocation.

Figure 3B:
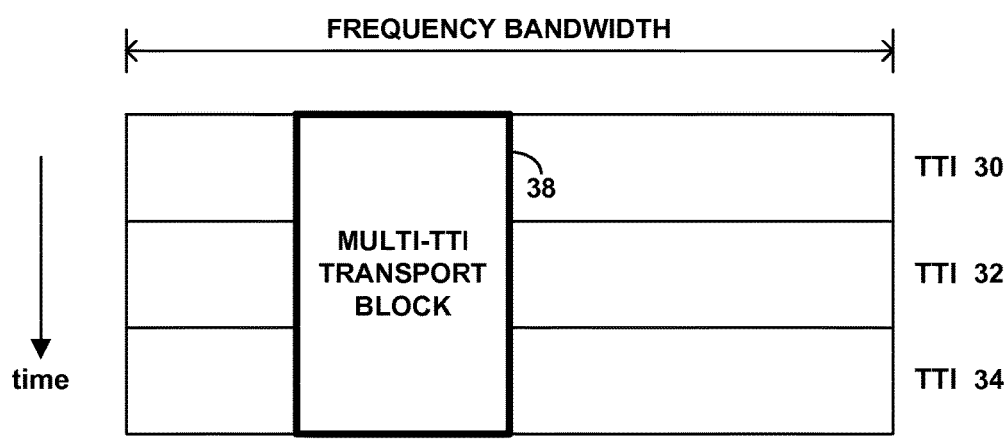

FIG. 3B depicts the same three consecutive TTIs 30-34 as FIG. 3A, and then depicts a representative multi-TTI transport block 38 spanning portions of all three TTIs. In practice this multi-TTI transport block may consist of PRBs in each TTI. Further, although the figure shows the transport block using the same PRBs (i.e., the same frequency segments) in each TTI of the multiple TTIs, a representative multi-TTI transport block could alternatively encompass different PRBs in the various TTIs. And as with a single-TTI transport block, the PRBs in a given TTI could alternatively be non-contiguous. Moreover, it may also be possible for the multiple TTIs in a multi-TTI transport block to not themselves be contiguous in time. For instance, a multi-TTI transport block may define a transport block as consisting of PRBs in every other TTI for a series of TTIs (e.g., in a time division duplex arrangement), or in some other arrangement.

In practice, a UE or base station may determine that an allocated single-TTI transport block would not be large enough to carry a MAC PDU of a particular size by predicting how large the single-TTI transport block would be and what MCS the UE would use for the transmission, and determining based on that prediction whether the transport block would be large enough to carry the MAC PDU.

For instance, the UE or base station may keep a record of the size of single-TTI transport blocks that the base station has recently been allocating to the UE, which would likely account for the UE's channel conditions, air interface load, available transmission power, and the like, and the UE or base station may predict that the allocate single-TTI transport block will likely be about the same size as recently allocated. Alternatively, the UE or base station may have another basis to determine what size the single-TTI transport block will be.

Further, the UE or base station may keep a record of the MCS that the UE has recently used and may predict that the UE would use the same MCS. On the other hand, if the UE or base station detects that the UE's channel conditions have degraded, the UE or base station may then predict that the UE will use a lower order MCS (lower coding rate MCS) than the MCS recently used. Alternatively, the UE or base station may have another basis to determine what MCS it will use.

Given the prediction of transport block size and MCS, and given knowledge of the MAC PDU size, the UE or base station may then determine whether the MAC PDU, when coded per the MCS, would fit within the transport block. If so, then the UE and base station may continue to operate in the single-TTI transport block mode. Whereas, if not, then the UE and base station may responsively transition to the multi-TTI transport block allocation mode. For instance, if the UE decides to make this transition, the UE may transmit a control signal, such as a specially configured scheduling request, on the PDCCH to the base station, requesting or directing and thus causing the base station to provide multi-TTI transport block allocation to the UE, for a next transport block allocation or on an ongoing basis until the UE transitions back to the single-TTI transport block allocation mode.

Figure 4:
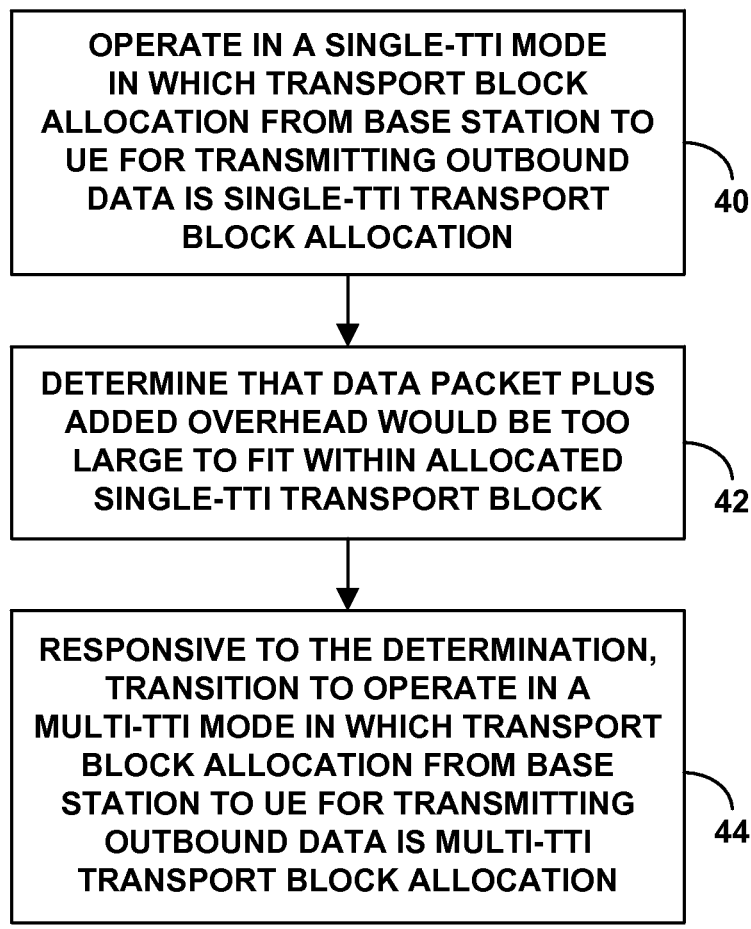
FIG. 4 is a flow chart depicting operations of an example method.

FIG. 4 is next a flow chart depicting a method that can be carried out in accordance with the present disclosure, to help manage communication over an air interface (e.g., an OFDMA air interface) between a UE and a base station serving the UE, where the air interface defines a continuum of transmission TTIs each defining air interface resources (e.g., PRBs), and where the UE is configured with a protocol stack through which the UE processes outbound data for transmission from the UE to the base station, the protocol stack including an upper layer that provides a data packet (e.g., representing a portion of a real-time media stream, such as a voice stream, and of predefined size) for transmission, one or more middle layers that add overhead to the data packet, and a physical layer that transmits the data packet with the added overhead via the air interface to the base station. In a representative implementation, the depicted method can be carried out by the UE and/or by a base station.

As shown in FIG. 4, at block 40, the method includes operating in a single-TTI mode in which transport block allocation from the base station to the UE for transmitting the outbound data is single-TTI transport block allocation. At block 42, the method then includes determining that the data packet plus the added overhead would be too large to fit within an allocated single-TTI transport block. And at block 44, the method includes, responsive to that determination, transitioning to operate in a multi-TTI mode in which transport block allocation from the base station to the UE for transmitting the outbound data is multi-TTI transport block allocation.

In this process, as noted above, the act of transitioning to operate in the multi-TTI mode may involve transmitting from the UE to the base station (and thus receiving by the base station from the UE) control signaling requesting the base station as well to transition to the multi-TTI mode, which may cause the base station to then provide multi-TTI transport block allocation to the UE rather than providing single-TTI transport block allocation to the UE.

Further, as discussed above, the act of determining that the data packet plus the added overhead would be too large to fit within a single-TTI transport block may involve prediction as noted above. For instance, this may involve (i) predicting a size of a single-TTI transport block that would be allocated to the UE for transmission and a bit rate at which the UE would encode the data packet plus the added overhead for transmission in the allocated single-TTI transport block, (ii) based on the predicted size of the single-TTI transport block and the predicted bit rate, determining a data capacity of single-TTI transport block, and (iii) determining that the data packet plus the added overhead is of a total size greater than the determined data capacity. Moreover, in this process, the act of predicting the size of the single-TTI transport block that would be allocated to the UE for transmission and the bit rate at which the UE would encode data packet plus the added overhead for transmission in the allocated single-TTI transport block may be based on recent allocation of air interface resources to the UE and recent data coding rate applied by the UE.

In addition, as discussed above, the UE may receive from the base station DCI messages that specify air interface allocation to the UE. And in the single-TTI mode, each DCI message may allocate one or more transport blocks each in just a single-TTI. Whereas, in the multi-TTI mode, at least one DCI message may allocate one or more transport blocks each spanning multiple TTIs.

Figure 5:
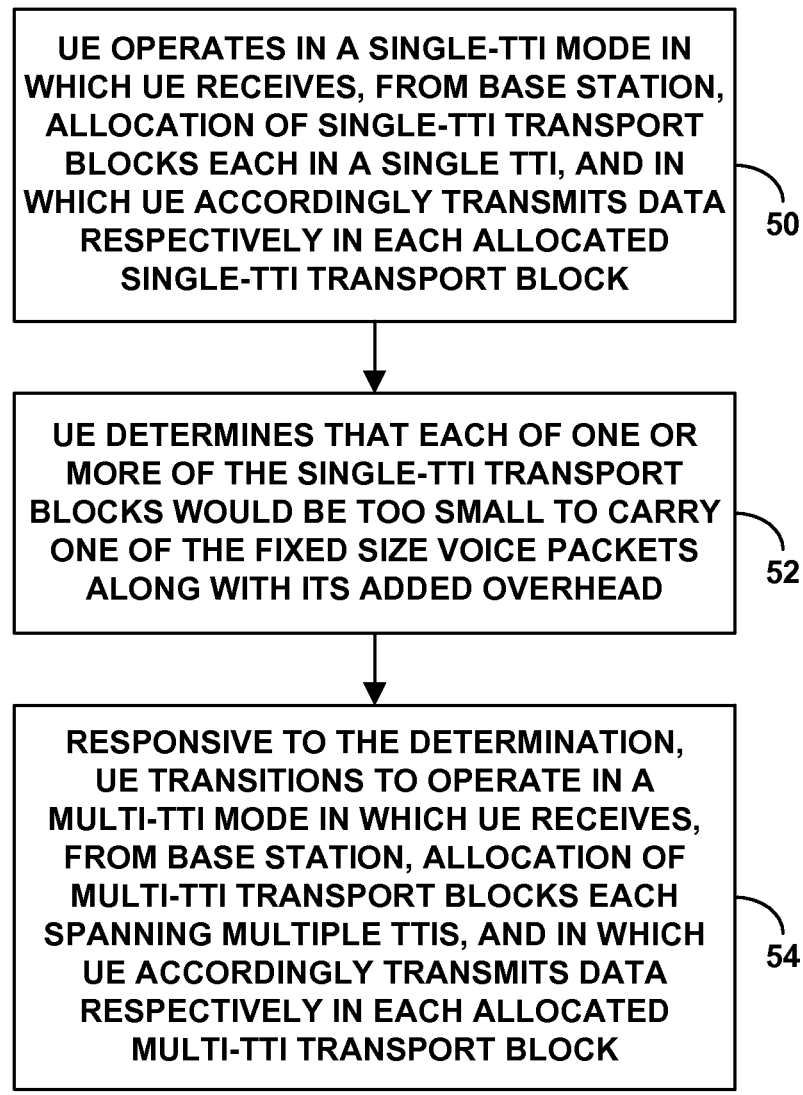
FIG. 5 is another flow chart depicting operations of an example method.

FIG. 5 is next another flow chart depicting a method that can be carried out in accordance with the present disclosure, to help manage voice communication over an air interface between a UE and a base station serving the UE, where the air interface defines a continuum of TTIs each defining air interface resources, and wherein the UE is configured with a protocol stack through which the UE processes outbound data for transmission from the UE to the base station, the protocol stack including a PDCP layer that provides voice packets of a fixed size periodically for transmission, an RLP layer and MAC layer that add overhead respectively to each voice packet, and a physical layer that transmits each voice packet respectively with the added overhead via the air interface to the base station.

As shown in FIG. 5, at block 50, the method involves the UE operating in a single-TTI mode in which the UE receives, from the base station, allocation of single-TTI transport blocks each in a single TTI, and in which the UE accordingly transmits data respectively in each allocated single-TTI transport block. Further, at block 52, the method involves the UE determining that each of one or more of the single-TTI transport blocks would be too small to carry one of the fixed size voice packets along with its added overhead. And at block 54, the method involves, responsive to the determining, the UE transitioning to operate in a multi-TTI mode in which the UE receives, from the base station, allocation of multi-TTI transport blocks each spanning multiple TTIs, and in which the UE accordingly transmits data respectively in each allocated multi-TTI transport block.

Features discussed above can apply in this method as well. For instance, the act of transitioning from the single-TTI mode to the multi-TTI mode may could involve the UE transmitting to the base station control signaling requesting the base station as well to transition to the multi-TTI mode, to cause the base station to then allocate to the UE multi-TTI transport blocks rather than single-TTI transport blocks. And the act of the UE determining that one or more of the single-TTI transport blocks would be too small to carry one of the fixed size voice packets along with its added overhead could involve the UE predicting a size of a single-TTI transport block that would be allocated to the UE for transmission and a bit rate at which the UE would encode the data packet plus the added overhead for transmission in the allocated single-TTI transport block, the UE determining a data capacity of the single-TTI transport block based on the predicted size of the single-TTI transport block and the predicted bit rate, and the UE determining that the data packet plus the added overhead is of a total size greater than the determined data capacity.

Further, as discussed above, the UE may receive from the base station one or more SPS scheduling messages (e.g., DCI messages) for transmission of the voice packets. And in that case, in the single-TTI mode, an SPS message may direct the UE to transmit each voice packet plus its added overhead respectively in a single-TTI transport block. Whereas, in the multi-TTI mode, an SPS message may direct the UE to transmit each voice packet plus its added overhead respectively in a multi-TTI transport block.

Finally, FIG. 6 is a simplified block diagram of an example apparatus (e.g., UE or other wireless communication device) operable to be served by a base station over an air interface, where the air interface defines a continuum of TTIs each defining air interface resources. As shown in FIG. 6, the example apparatus includes a wireless communication interface 60 for engaging in wireless communication over the air interface with the base station and a controller 62 operable to manage communication of data from the apparatus to the base station. In practice, the controller could be integrated with the wireless communication interface, on a common chipset for instance. Further, the controller 62 could comprise one or more microprocessors or other processing units programmed with instructions executable to cause the controller, and thus the apparatus, to carry out various operations described herein.

In a representative implementation, the controller 62 may define a protocol stack through which the apparatus processes outbound data for transmission from the apparatus to the base station, the protocol stack including an upper layer that provides a data packet for transmission, one or more middle layers that add overhead to the data packet, and a physical layer that transmits the data packet with the added overhead via the air interface to the base station. Further, the apparatus may be configured to operate in a single-TTI mode in which the apparatus receives via the wireless communication interface, from the base station, allocation of single-TTI transport blocks for transmitting the outbound data, and in which the apparatus transmits the outbound data via the wireless communication interface accordingly.

The controller may then be configured to make a determination that the data packet plus the added overhead would be too large to fit within a single-TTI transport block that would be allocated to the apparatus and to respond to the determination by causing the apparatus to transition from operating in the single-TTI mode to operating in a multi-TTI mode. In the multi-TTI mode, the apparatus may then receive via the wireless communication interface, from the base station, allocation of multi-TTI transport blocks, rather than single-TTI transport blocks, for transmitting the outbound data, and the apparatus may transmit the outbound data via the wireless communication interface accordingly.

Exemplary embodiments have been described above. Those skilled in the art will understand, however, that changes and modifications may be made to these embodiments without departing from the true scope and spirit of the invention.

We claim:

1. A method for managing communication over an air interface between a user equipment device (UE) and a base station serving the UE, wherein the air interface defines a continuum of transmission time intervals (TTIs) each defining air interface resources, and wherein the UE is configured with a protocol stack through which the UE processes outbound data for transmission from the UE to the base station, the protocol stack including an upper layer that provides a data packet for transmission, one or more middle layers that add overhead to the data packet, and a physical layer that transmits the data packet with the added overhead via the air interface to the base station, the method comprising:

operating in a single-TTI mode in which transport block allocation from the base station to the UE for transmitting the outbound data is single-TTI transport block allocation, wherein the single-TTI transport block allocation allocates a transport block in just a single TTI;

determining that the data packet plus the added overhead would be too large to fit within an allocated single-TTI transport block, wherein determining that the data packet plus the added overhead would be too large to fit within the allocated single-TTI transport block comprises (i) predicting a size of a single-TTI transport block that would be allocated to the UE for transmission and a bit rate at which the UE would encode the data packet plus the added overhead for transmission in the allocated single-TTI transport block, (ii) based on the predicted size of the single-TTI transport block and the predicted bit rate, determining a data capacity of single-TTI transport block, and (iii) determining that the data packet plus the added overhead is of a total size greater than the determined data capacity; and responsive to the determining, transitioning from the single-TTI mode to a multi-TTI mode in which transport block allocation from the base station to the UE for transmitting the outbound data is multi-TTI transport block allocation, wherein the multi-TTI transport block allocation allocates a transport block spanning multiple TTIs.

2. The method of claim 1, wherein transitioning to the multi-TTI mode comprises transmitting from the UE to the base station control signaling requesting the base station to transition to the multi-TTI mode, to cause the base station to then provide the multi-TTI transport block allocation to the UE rather than providing the single-TTI transport block allocation to the UE.

3. The method of claim 1, wherein the air interface is an orthogonal frequency division multiple access air interface, wherein the air interface resources defined in each TTI are physical resource blocks.

4. The method of claim 1, wherein the data packet represents a portion of a real-time media stream and is of predefined size.

5. The method of claim 4, wherein the media stream is a digitized voice stream.

6. The method of claim 1, wherein the upper layer is a Packet Data Convergence Protocol (PDCP) layer that provides the data packet, and wherein the one or more middle layers comprise a Radio Link Protocol (RLP) layer and a Media Access Control (MAC) layer that cooperatively add the overhead to the data packet.

7. The method of claim 1, wherein predicting the size of the single-TTI transport block that would be allocated to the UE for transmission and the bit rate at which the UE would encode data packet plus the added overhead for transmission in the allocated single-TTI transport block is based on recent allocation of air interface resources to the UE and recent data coding rate applied by the UE.

8. The method of claim 1, wherein the UE receives from the base station Downlink Control Information (DCI) messages specifying air interface allocation to the UE, and wherein:
   in the single-TTI mode, each DCI message allocates one or more transport blocks each in just a single TTI, and
   in the multi-TTI mode, at least one DCI message allocates one or more transport blocks each spanning multiple TTIs.

9. A method for managing voice communication over an air interface between a user equipment device (UE) and a base station serving the UE, wherein the air interface defines a continuum of transmission time intervals (TTIs) each defining air interface resources, and wherein the UE is configured with a protocol stack through which the UE processes outbound data for transmission from the UE to the base station, the protocol stack including a Packet Data Convergence Protocol (PDCP) layer that provides voice packets of a fixed size periodically for transmission, a Radio Link Protocol (RLP) layer and Media Access Control (MAC) layer that add overhead respectively to each voice packet, and a physical layer that transmits each voice packet respectively with the added overhead via the air interface to the base station, the method comprising:
   operating by the UE in a single-TTI mode in which the UE receives, from the base station, allocation of single-TTI transport blocks each in a single TTI, and in which the UE accordingly transmits data respectively in each allocated single-TTI transport block;
   determining by the UE that each of one or more of the single-TTI transport blocks would be too small to carry one of the fixed size voice packets along with its added overhead, wherein determining by the UE that each of one or more of the single-TTI transport blocks would be too small to carry one of the fixed size voice packets along with its added overhead comprises (i) predicting by the UE a size of a single-TTI transport block that would be allocated to the UE for transmission and a bit rate at which the UE would encode the data packet plus the added overhead for transmission in the allocated single-TTI transport block, (ii) based on the predicted size of the single-TTI transport block and the predicted bit rate, determining by the UE a data capacity of single-TTI transport block, and (iii) determining by the UE that the data packet plus the added overhead is of a total size greater than the determined data capacity; and
   responsive to the determining, transitioning by the UE to operate in a multi-TTI mode in which the UE receives, from the base station, allocation of multi-TTI transport blocks each spanning multiple TTIs, and in which the UE accordingly transmits data respectively in each allocated multi-TTI transport block.

10. The method of claim 9, wherein transitioning to operate in the multi-TTI mode comprises transmitting from the UE to the base station control signaling requesting the base station as well to transition to the multi-TTI mode, to cause the base station to then provide the allocation of multi-TTI transport blocks rather than the allocation of single-TTI transport blocks.

11. The method of claim 9, wherein the air interface is an orthogonal frequency division multiple access air interface, wherein the air interface resources defined in each TTI are physical resource blocks.

12. The method of claim 9, wherein predicting by the UE a size of a single-TTI transport block that would be allocated to the UE for transmission and a bit rate at which the UE would encode the data packet plus the added overhead for transmission in the allocated single-TTI transport block is based on recent allocation of air interface resources to the UE and recent data coding rate applied by the UE.

13. The method of claim 9, wherein the UE receives from the base station semi-persistent scheduling (SPS) messages for transmission of the voice packets, and wherein:
   in the single-TTI mode, an SPS message directs the UE to transmit each voice packet plus its added overhead in a respective single-TTI transport block, and
   in the multi-TTI mode, an SPS message directs the UE to transmit each voice packet plus its added overhead in a respective multi-TTI transport block.

14. An apparatus operable to be served by a base station over an air interface, wherein the air interface defines a continuum of transmission time intervals (TTIs) each defining air interface resources, the apparatus comprising:
   a wireless communication interface for engaging in wireless communication over the air interface with the base station;
   a controller operable to manage communication of data from the apparatus to the base station,
   wherein the controller defines a protocol stack through which the apparatus processes outbound data for transmission from the apparatus to the base station, the protocol stack including an upper layer that provides a data packet for transmission, one or more middle layers that add overhead to the data packet, and a physical layer that transmits the data packet with the added overhead via the air interface to the base station,
   wherein the apparatus is configured to operate in a single-TTI mode in which the apparatus receives via the wireless communication interface, from the base station, allocation of single-TTI transport blocks for transmitting the outbound data, each single-TTI transport block being a transport block that will be in a single TTI, and in which the apparatus transmits the outbound data via the wireless communication interface accordingly, and wherein the controller is configured to make a determination that the data packet plus the added overhead would be too large to fit within a single-TTI transport block that would be allocated to the apparatus and to respond to the determination by causing the apparatus to transition from operating in the single-TTI mode to operating in a multi-TTI mode, wherein, in the multi-TTI mode, the apparatus receives via the wireless communication interface, from the base station, allocation of multi-TTI transport blocks, rather than single-TTI transport blocks, for transmitting the outbound data, each multi-TTI transport block being a transport block that will span multiple TTIs, and in which the apparatus transmits the outbound data via the wireless communication interface accordingly, wherein to make the determination that the data packet plus the added overhead would be too large to fit within the single-TTI transport block that would be allocated to the apparatus, the controller is configured to carry out operations comprising (i) predicting a size of a single-TTI transport block that would be allocated to the apparatus and a data coding rate at which the apparatus would encode the data packet plus the added overhead for transmission in the allocated single-TTI transport block, (ii) based on the predicted size of the single-TTI transport block and the predicted data coding rate, determining a data capacity of the single-TTI transport block, and (iii) determining that the data packet plus the added overhead is of a total size greater than the determined data capacity.

15. The apparatus of claim 14, wherein the data packet represents a portion of a digitized voice stream and is of predefined size.

16. The apparatus of claim 14, wherein the air interface is an orthogonal frequency division multiple access (OFDMA) air interface, wherein the air interface resources are physical resource blocks, wherein the upper layer is a Packet Data Convergence Protocol (PDCP) layer that provides the data packet, and wherein the one or more middle layers comprise a Radio Link Protocol (RLP) layer and a Media Access Control (MAC) layer that cooperatively add the overhead to the data packet.

17. The apparatus of claim 14, wherein predicting the size the single-TTI transport block that would be allocated to the apparatus and the data coding rate at which the apparatus would encode the data packet plus the added overhead for transmission in the allocated single-TTI transport block is based on recent allocation of air interface resources to the apparatus and recent data coding rate applied by the apparatus.

* * * * *